Patented June 1, 1926.

1,587,077

UNITED STATES PATENT OFFICE.

WALTER KROPP AND WILHELM SCHRANZ, OF ELBERFELD, AND WERNER SCHULEMANN, OF VOHWINKEL, GERMANY, ASSIGNORS, BY MESNE ASSIGNMENTS, TO WINTHROP CHEMICAL COMPANY, INC., OF NEW YORK, N. Y., A CORPORATION OF NEW YORK.

ANTHELMINTIC REMEDY.

No Drawing. Original application filed February 1, 1924, Serial No. 690,073, and in Germany February 9, 1923. Divided and this application filed November 29, 1924. Serial No. 752,939.

This application is a division of our application Ser. No. 690,073 filed Feb. 1, 1924. In said application Ser. No. 690,073 the manufacture and production of ortho-benzylphenol which is a valuable anthelmintic remedy is described. It does not irritate the mucous membranes.

It is advantageous to give to the patients or animals the ortho-benzylphenol in combination with other compounds for the purpose that the mixture be in molten or liquid state in the human or animal body. We have found that an admixture of the para-benzylphenol has proved to be advantageous for this purpose, e. g., a mixture of 50-75 per cent ortho- with 50-25 per cent para-benzylphenol is a valuable anthelmintic remedy in doses of 1-2 grams for human beings and 1 gram for sheep. Such a mixture can be obtained by admixing ortho- or para-benzylphenol to the product of the reaction of benzylhalide on phenols.

We claim:—

1. A new anthelmintic remedy comprising a mixture of ortho- and para-benzylphenol an average single dose being from 1-2 grams for human beings and about one gram for sheep, substantially as described.

2. A new anthelmintic remedy comprising a mixture of 50 to 75 parts of ortho-benzylphenol and 50 to 25 parts of para-benzylphenol.

In testimony whereof we have hereunto set our hands.

WALTER KROPP.
WILHELM SCHRANZ.
WERNER SCHULEMANN.